(12) United States Patent
Miller et al.

(10) Patent No.: US 6,545,717 B1
(45) Date of Patent: Apr. 8, 2003

(54) DISPLAY SYSTEM HAVING SELECTABLE AUTOMATIC CRT CUTOFF STABILIZATION OR AKB WITH CRT FEEDBACK CURRENT SIMULATION

(75) Inventors: William G. Miller, Knoxville, TN (US); Mark Laramie, Knoxville, TN (US); Gregg Keck, Knoxville, TN (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/963,193

(22) Filed: Sep. 26, 2001

(51) Int. Cl.[7] .............................. H04N 5/68; G09G 1/04
(52) U.S. Cl. ..................... 348/380; 380/377; 380/707; 380/121; 315/384; 315/383; 315/387
(58) Field of Search .................................. 315/384, 383, 315/387, 379, 3; 348/380, 377, 707, 121, 327, 478, 4

(56) References Cited

U.S. PATENT DOCUMENTS

| | | | |
|---|---|---|---|
| 4,253,110 A | * 2/1981 | Harwood et al. ........... 348/380 |
| 5,644,360 A | * 7/1997 | Gurley et al. ............... 348/381 |
| 5,670,972 A | * 9/1997 | Kim ............................ 345/13 |
| 5,835,161 A | * 11/1998 | Keller ........................ 348/674 |
| 6,285,401 B1 | * 9/2001 | Griepentrog ................ 348/380 |

* cited by examiner

*Primary Examiner*—Tan Ho
*Assistant Examiner*—Tuyet T. Vo
(74) *Attorney, Agent, or Firm*—Edward W. Goodman

(57) ABSTRACT

A display system (10) which includes a CRT feedback current simulating circuit (20) to simulate the cathode feedback current directly from the from the red, green and blue output biases of the video processor (13). Furthermore, the display system (10) applies blanking to the references pulses applied to the CRT output driving stage (16) so that the reference pulses will not be visible during a vertical underscanned condition. Shifting the generation of the cathode feedback current prior to the application of the blanking prevents any significant distortion, modification or skewing of the cathode feedback current sensed by the AKB sensing circuitry (19) of the video processor (13).

19 Claims, 3 Drawing Sheets

DISPLAY SYSTEM HAVING SELECTABLE AUTOMATIC CRT CUTOFF STABILIZATION OR AKB WITH CRT FEEDBACK CURRENT SIMULATION

FIELD OF THE INVENTION

This invention relates to CRT or the like display systems, and more particularly to a display system having selectable automatic CRT cutoff stabilization or auto kinescope bias (AKB) with CRT feedback current simulation.

BACKGROUND OF THE INVENTION

Automatic cathode ray tube (CRT) cutoff stabilization is conventionally achieved by inserting reference pulses near the video black level during the vertical blanking interval. In a closed loop manner, relative DC biases are varied to achieve equal CRT red, green and blue (RGB) cathode currents. Normally, there reference pulses are in the top overscanned part of the display and are not visible. However, in display modes in which the vertical deflection is underscanned, such as in the case where a 16:9 aspect ratio picture is displayed on a 4:3 display, these reference pulses become visible and distracting.

Referring now to FIG. 1, a schematic diagram of a conventional display system 1 with auto kinescope bias (AKB) is shown. The display system 1 includes a video processor integrated circuit (IC) 3 which monitors the current feedback on line 2 feed to the current feedback input terminal 5 during reference pulse intervals and adjusts the red (R) output bias 4R, the green (G) output bias 4G, and the blue (B) output bias 4B to maintain equal cathode currents. The display system 1 further includes a CRT output driving stage 6 having a plurality of CRT drive amplifiers 6a, 6b, 6c which are operational amplifiers. Each of the CRT drive amplifiers 6a, 6b, 6c have three outputs on lines $8_1$, $8_2$ and $8_3$. The output on line $8_1$ of a respective CRT drive amplifier 6a, 6b, 6c drives a respective red, green and blue CRT's cathode RC, GC and BC and sink current. The output on line $8_2$ of a respective CRT drive amplifier 6a, 6b, 6c supplies the cathode feedback current to the AKB sensing circuitry 9 of the video processor integrated circuit (IC) 3 on line 2. The output on line $8_3$ of a respective CRT drive amplifier 6a, 6b, 6c drives a respective one of the feedback resistors R7, R8, R9.

The CRT drive amplifiers 6a, 6b, 6c each have a resistor or impedance R4, R5 and R6, respectively, coupled to a first input terminal of a respective CRT drive amplifier 6a, 6b, 6c. Moreover, feedback resistors R7, R8 and R9 are coupled to between the resistor or impedance R4, R5 and R6, respectively, and the input terminal of its respective CRT drive amplifier 6a, 6b, 6c. Furthermore, each of the CRT drive amplifiers 6a, 6b, 6c have a second input terminal which receives reference pulses near the video black level during the vertical blanking interval on line 7.

SUMMARY OF THE INVENTION

The present invention contemplates a display system which has a means for stabilizing the AKB closed loop in the absence of a CRT supplying the cathode feedback current and which applies blanking to prevent the reference pulses from being visible.

The present invention further contemplates a display system which has a means for selectively defeating AKB or, in other words, not using AKB and substituting an alternative cathode feedback current source such as during a vertical underscanned condition.

DETAILED DESCRIPTION OF THE INVENTION

Figure 2:
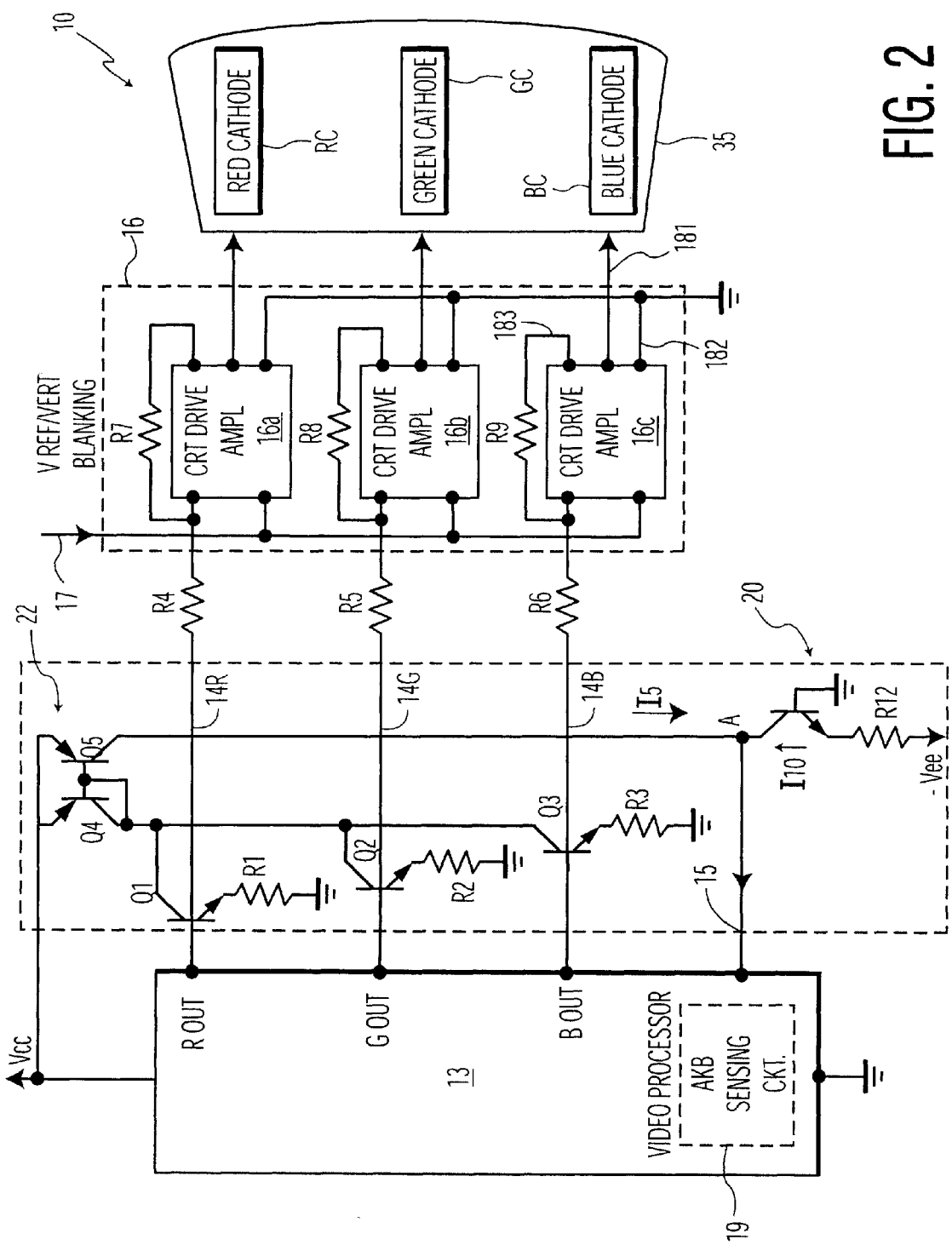
FIG. 2 illustrates a schematic diagram of a display system in accordance of the present invention.

Referring now to FIG. 2, the display system of the present invention is generally referenced by the numeral 10. The display system 10 in general eliminates visible reference pulses when the vertical deflection is underscanned by (1) applying blanking (a vertical blanking signal) to prevent reference pulses from being visible; and (2) replacing the conventional cathode feedback current from the outputs of the CRT output driving stage 16 with a simulated cathode feedback current from a CRT feedback current simulation circuit 20 positioned prior to the application of the blanking or the CRT output driving stage 16. The CRT feedback current simulation circuit 20 provides for the shifting of the cathode feedback current to a position prior the or the CRT output driving stage 6 so that a reference pulse/vertical blanking signal, on line 17, can be applied to the CRT output driving stage 6 without significantly distorting, modifying or skewing the cathode feedback current. In the exemplary embodiment, the simulated cathode feedback current is simulated directly from the red (R) output bias 14R, the green (G) output bias 14G and the blue (B) output bias 14B of the video processor integrated circuit (IC) 13.

The CRT feedback current simulation circuit 20 includes a current mirror 22, a red transistor Q1 having its base coupled to the red (R) output bias 14R, a green transistor Q2 having its base coupled to the green (G) output bias 14G and a blue transistor Q3 having its base coupled to the blue (B) output bias 14B. The current mirror 22 includes transistors Q4 and Q5 having their bases coupled together and to the collector of transistor Q4. The emitters of transistors Q4 and Q5 are coupled to Vcc. The collectors of the red transistor Q1, the green transistor Q2 and the blue transistor Q3 are all coupled to the collector and base of transistor Q4. The emitters of the red transistor Q1, the green transistor Q2 and the blue transistor Q3 have coupled thereto a respective emitter resistor or impedance R1, R2, R3 which are coupled to ground.

The CRT feedback current simulation circuit 20 further includes current sinking transistor Q10 having a collector tied to the collector of transistor Q5 of the current mirror 22 at node A. At node A, a net current is communicated to the current feedback input terminal 15 of the video processor integrated circuit (IC) 13. The base of transistor Q10 is coupled to ground and the emitter has a resistor or impedance R12 tied to voltage −Vee. As can be appreciated, the collector currents I5 and I10 of transistors Q5 and Q10 supply the net current to node A which defines the simulated cathode feedback current of the CRT feedback current simulation circuit 20. The simulated cathode feedback current is communicated from node A to the current feedback input terminal 15 of the video processor integrated circuit (IC) 13 and is sensed by the AKB sensing circuitry 19. It should be noted that AKB is also known or functions as CRT cutoff stabilization.

In operation the collector currents transistors Q1, Q2 and Q3 produced by the sequential reference levels during vertical retrace, mirrored via transistors Q4 and Q5 of current mirror 22, are each only slightly greater than the current sunk by the current sinking transistor Q10. By sinking current through transistor Q10, transistors Q1, Q2 and Q3 remain active at all times with relatively little change in their respective collector currents thereby, providing stable characteristics, especially for the Vbe (the base-emitter voltage, not shown). In other words, the output current from transistor Q5 of the current mirror 22 is sunk by transistor Q10. Collector currents from transistors Q5 and Q10 are in the milli-Amp range. However, the current to the current feedback input terminal 15 is in the micro-Amp range. Thus, when transistor Q5 is slightly greater than transistor Q10, the loop will stabilize which tends to minimize variations at the base-emitter junctions of the transistors Q1–Q3.

As can be appreciated, simulating CRT "cut-on" with transistor turn-on would be much less predictable and stable. In the exemplary embodiment, the CRT "cut-on" voltage is approximately a +180.0 Volts from grid. However, as is well known, at a voltage of approximately +179.9 V some current is drawn causing CRT illumination. Reference pulses/vertical blanking signal is applied to the CRT drive amplifiers 16a, 16b, 16c, on line 17, to prevent the reference pulses from being visible on the display 35 and, especially, in display modes where the vertical deflection is underscanned.

Figure 1:
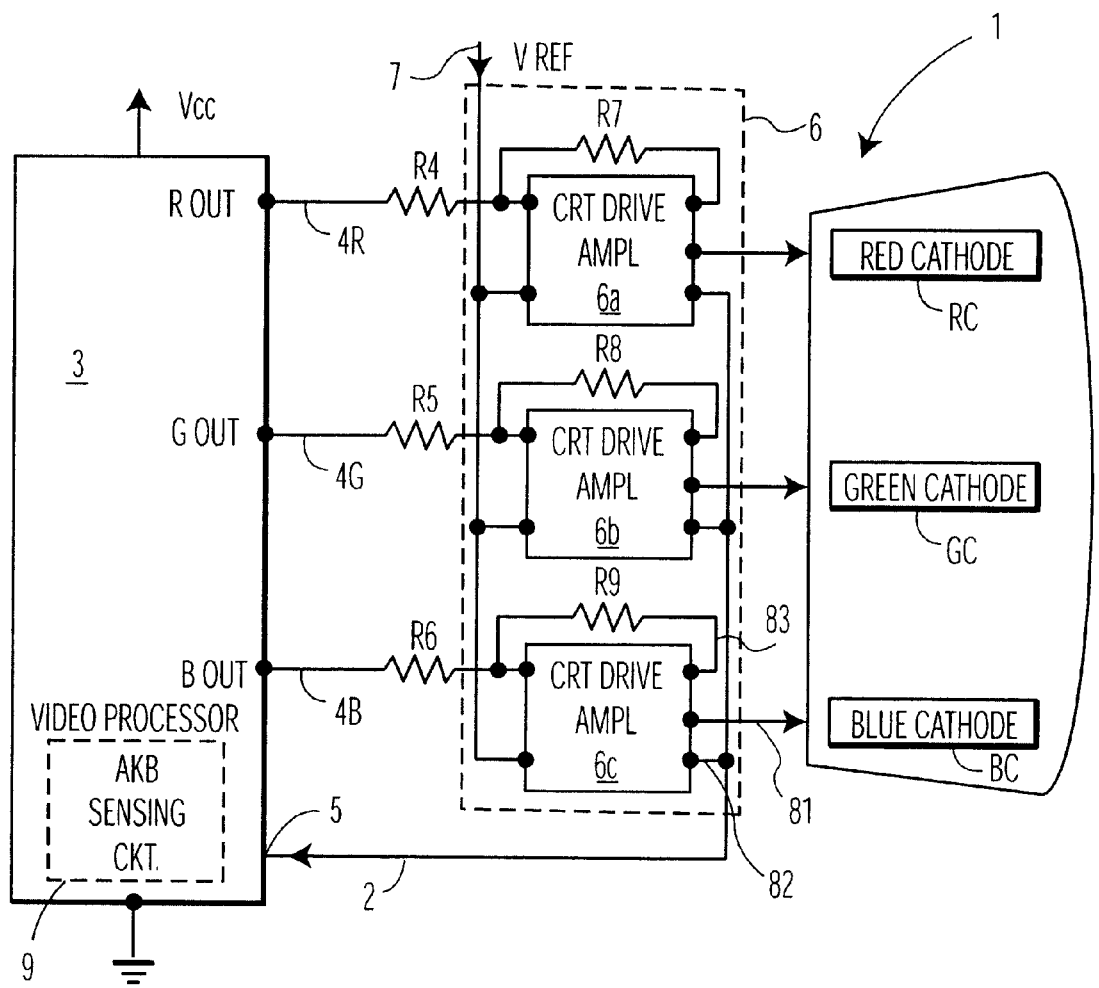
FIG. 1 illustrates a schematic diagram of a conventional display system.

Referring still to the schematic diagram of display system 10 of FIG. 1, the output on line $18_1$ of a respective CRT drive amplifier 16a, 16b, 16c drives a respective red, green and blue CRT's cathode RC, GC and BC and sink current of display 35. The output on line $18_2$ of a respective CRT drive amplifier 16a, 16b, 16c is coupled to ground. The output on line $18_3$ of a respective CRT drive amplifier 16a, 16b, 16c drives a respective one of the feedback resistors R7, R8, R9.

Figure 3:
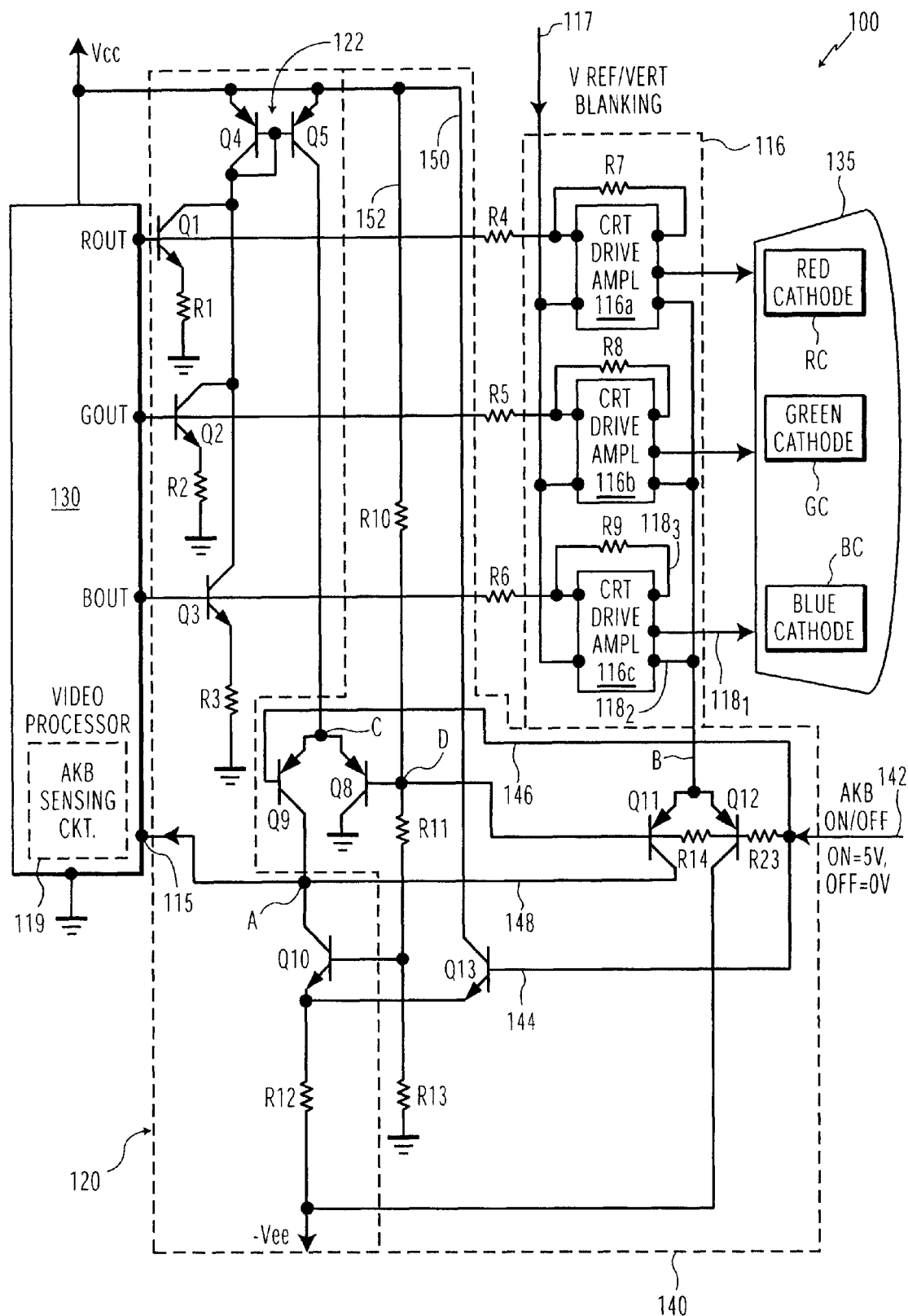
FIG. 3 illustrates an alternate embodiment of the schematic diagram of a display system in accordance of the present invention.

Referring now to FIG. 3, an alternate embodiment of the schematic diagram of a display system in accordance of the present invention is illustrated. The display system 100 includes selective switching circuitry 140 for selectively feeding a cathode feedback current from the CRT output driving stage 116 or a simulated cathode feedback current from the CRT feedback current simulation circuitry 120 to the current feedback input terminal 115 of the video processor integrated circuit (IC) 130. Since the CRT feedback current simulation circuitry 120 is essentially the same as the CRT feedback current simulation circuitry 20 of FIG. 2, no further discussion will be provided except as related to the selective switching circuitry 140.

Referring now to the selective switching circuitry 140, an AKB "on" or "off" signal is delivered on line 142 through resistor R23 to the base of transistor Q12 wherein an AKB "on" signal is substantially equal to 5V and the AKB "off" signal is substantially equal to 0V. The AKB "on" or "off" signal on line 142 is delivered to base transistor Q11 via resistor R14. The AKB "on" or "off" signal on line 142 is also delivered to the base of transistor Q13 on line 144 and the base of transistor Q9 on line 146. The base of transistor Q11 is coupled to the base of transistor Q8. The emitters of transistors Q11 and Q12 are tied together at node B which receives the second output from the CRT drive amplifiers 116a, 116b, 116c on line $118_2$. The current on line $118_2$ supplies the cathode feedback current to AKB sensing circuitry 119 via the current feedback input terminal 115. The collector of transistor Q12 is tied to −Vee.

Transistors Q8 and Q9 have theirs emitters tied to node C which is coupled to the collector of transistor Q5 of current mirror 122. The collector of transistor Q9 is coupled to the collector of transistor Q10 and to node A. The collector of transistor Q8 is tied to ground. The base of transistor Q11 is coupled to the base of transistor Q8 both of which are tied to Vcc, on line 152, through resistor R10 at node D. The emitter of transistor Q13 is coupled to the emitter of transistor Q10 at the first terminal of emitter resistor or impedance R12. The collector of transistor Q13 is coupled to Vcc on line 150. In this embodiment, the base of transistor Q10 is coupled to resistor R11 between the base of transistor Q8 wherein resistor R11 is in series with and between resistor R10 and resistor R13. Resistor R13 is coupled to ground.

In operation, when the AKB "on" signal is present on line 142, the CRT feedback current simulation circuitry 120 is selectively disabled and the collector of transistor Q11 operates to deliver the cathode feedback current from CRT drive amplifiers 116a, 116b, 116c on line $118_2$ on feedback line 148 to the current feedback input terminal 115 of the video processor integrated circuit (IC) 130 and which is sensed by the AKB sensing circuitry 119.

On the other hand, when the AKB "off" signal is present on line 142, the CRT feedback current simulation circuitry 120 is selectively enabled and the net collector currents from the transistor Q5 via transistor Q9 and transistor Q10 at node A deliver a simulated cathode feedback current to the current feedback input terminal 115.

Transistor pair Q11 and Q12 and transistor pair Q8 and Q9 are alternately biased "on" and "off". Thus, when the AKB "on" signal is present, transistor Q11 is on, transistor Q12 is off, transistor Q8 is on, transistor Q9 is off and transistor Q13 turns transistor Q10 off. Therefore, the only the resultant cathode feedback current at node B is communicated through node A via line 148 and to the current feedback input terminal 115.

However, when the AKB "off" signal is present, transistor Q11 is off, transistor Q12 is on, transistor Q8 is off, and transistor Q9 is on. Therefore, the simulated cathode feedback current at node A is the net collector current from the collectors of transistor Q5 via transistor Q9 and transistor Q10 and is feed to the current feedback input terminal 115.

In this embodiment, the CRT feedback current simulation circuitry 120 only needs to be activated during an underscanned mode of operation such as, without limitation, when a 16:9 aspect ratio is displayed in a 4:3 display. Otherwise, during modes other than the underscanned mode, there is no reason to defeat the AKB with an alternate cathode feedback current source. Hence, an external switch (not shown) may be provided on the display 135 to supply the AKB "on"/"off" signal on line 142.

Referring still to the schematic diagram of the embodiment of FIG. 3, the output on line $118_1$ of a respective CRT drive amplifier 116a, 116b, 116c drives a respective red, green and blue CRT's cathode RC, GC and BC and sink current of display 135. The output on line $118_3$ of a respective CRT drive amplifier 16a, 16b, 16c drives a respective one of the feedback resistors R7, R8, R9. The CRT drive amplifiers 116a, 116b, 116c each have a resistor or impedance R4, R5 and R6, respectively, coupled to a first input terminal of a respective CRT drive amplifier 116a, 116b, 116c. Moreover, feedback resistors R7, R8 and R9 are coupled to between the resistor or impedance R4, R5 and R6, respectively, and the input terminal of its respective CRT drive amplifier 116a, 116b, 116c. Furthermore, each of the CRT drive amplifiers 116a, 116b, 116c have a second input terminal which receives reference pulses/vertical blanking signal near the video black level during the vertical blanking interval on line 117. It should be noted that the vertical blanking signal is applied on lines 17 and 117 only in the AKB off mode.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A display system comprising:
   a video processor producing a red output bias, a green output bias and a blue output bias;
   a cathode ray tube (CRT) output driving stage which receives the red, green and blue output biases, a reference pulse and a vertical blanking signal, and drives red, green and blue cathodes of a display; and,
   a CRT feedback current simulation circuit which receives the red, green and blue output biases and which is coupled to the CRT output driving stage to create a simulated cathode feedback current to the video processor.

2. The system according to claim 1, wherein the video processor includes auto kinescope bias (AKB) sensing circuitry and the simulated cathode feedback current is sensed by the AKB sensing circuitry.

3. The system according to claim 1, further comprising:
   switching circuitry for selectively switching between the cathode feedback current from the CRT output driving stage and the simulated cathode feedback current from the CRT feedback current simulation circuit to prevent reference pulses from being visible during a vertical underscanned condition.

4. The system according to claim 1, wherein the CRT output driving stage includes:
   a first CRT driving amplifier which drives the red cathode;
   a second CRT driving amplifier which drives the green cathode; and,
   a third CRT driving amplifier which drives the blue cathode.

5. The system according to claim 1, wherein the CRT feedback current simulation circuit includes:
   a current mirror having a first transistor and a second transistor;
   a red output bias transistor having a base which receives the red output bias, a collector coupled to the first transistor of the current mirror and an emitter coupled to a first resistor;
   a green output bias transistor having a base which receives the green output bias, a collector coupled to the first transistor of the current mirror and an emitter coupled to a second resistor;
   a blue output bias transistor having a base which receives the blue output bias, a collector coupled to the first transistor of the current mirror and an emitter coupled to a third resistor; and,
   a current sinking transistor having a base coupled to ground, an emitter coupled to a fourth resistor and a collector coupled to a collector of the second transistor wherein a net current of a collector current of the current sinking transistor and a collector current of the second transistor provides the simulated cathode feedback current.

6. The system according to claim 5, further comprising:
   switching circuitry for selectively switching between the cathode feedback current from the CRT output driving stage and the simulated cathode feedback current from the CRT feedback current simulation circuit to prevent reference pulses from being visible during a vertical underscanned condition.

7. The system according to claim 6, wherein the switching circuitry includes:
   a first transistor pair having alternately biased transistors which receive the cathode feedback current from the CRT output driving stage and a switching signal, wherein the first transistor pair selectively delivers the cathode feedback current to the video processor;
   a second transistor pair having alternately biased transistors and which is positioned between the collector of the second transistor and the a collector of the current sinking transistor and which receives the switching signal; and,
   a switching transistor which receives the switching signal and is adapted to selectively turn off the current sinking transistor.

8. A method of blanking reference pulses on a display comprising the steps of:
   producing, by a video processor, a red output bias, a green output bias and a blue output bias;
   simulating, by cathode ray tube feedback current simulation circuit, a cathode feedback current to the video processor directly from the red, green and blue output biases;
   creating CRT driving signals at a CRT output driving stage from the red, green and blue output biases and a reference pulses and vertical blanking signal; and,
   driving red, green and blue cathodes of the display with the CRT driving signals.

9. The method according to claim 8, further comprising the step of sensing, by auto kinescope bias (AKB) sensing circuitry, the simulated cathode feedback current.

10. The method according to claim 9, further comprising the steps of:
    creating a cathode feedback current at the CRT output driving stage; and,
    switching the CRT feedback current simulation circuit off; and,
    communicating the cathode feedback current from the CRT output driving stage to the AKB sensing circuitry.

11. The method according to claim 10, wherein the simulating step prevents reference pulses from being visible during a vertical underscanned condition.

12. The method according to claim 10, wherein the simulating step further includes the step of switching the CRT feedback current simulation circuit on during a vertical underscanned condition.

13. A cathode ray tube display system comprising:
    a video processor producing a red output bias, a green output bias and a blue output bias;
    a CRT output driving stage which receives the red, green and blue output biases and a reference pulses and vertical blanking signal and drives red, green and blue cathodes of a display; and,
    a CRT feedback current simulation circuit which simulates a simulated cathode feedback current directly from the red, green and blue output biases of the video processor.

14. The system according to claim 13, wherein:

the video processor includes auto kinescope bias sensing circuitry; and, the simulated cathode feedback current is sensed by the AKB sensing circuitry.

15. The system according to claim 13, further comprising:

switching circuitry for selectively switching between the cathode feedback current from the CRT output driving stage and the simulated cathode feedback current from the CRT feedback current simulation circuit to prevent reference pulses from being visible during a vertical underscanned condition.

16. The system according to claim 13, wherein the CRT output driving stage includes:

a first CRT driving amplifier which drives the red cathode;

a second CRT driving amplifier which drives the green cathode; and, a third CRT driving amplifier which drives the blue cathode.

17. The system according to claim 13, wherein the CRT feedback current simulation circuit includes:

a current mirror having a first transistor and a second transistor;

a red output bias transistor having a base which receives the red output bias, a collector coupled to the first transistor of the current mirror and an emitter coupled to a first resistor;

a green output bias transistor having a base which receives the green output bias, a collector coupled to the first transistor of the current mirror and an emitter coupled to a second resistor;

a blue output bias transistor having a base which receives the blue output bias, a collector coupled to the first transistor of the current mirror and an emitter coupled to a third resistor; and, a current sinking transistor having a base coupled to ground, an emitter coupled to a fourth resistor and a collector coupled to a collector of the second transistor, wherein a net current of a collector current of the current sinking transistor and a collector current of the second transistor provide the simulated cathode feedback current.

18. The system according to claim 17, further comprising:

switching circuitry for selectively switching between the cathode feedback current from the CRT output driving stage and the simulated cathode feedback current from the CRT feedback current simulation circuit to prevent reference pulses from being visible during a vertical underscanned condition.

19. The system according to claim 18, wherein the switching circuitry includes:

a first transistor pair having alternately biased transistors which receive the cathode feedback current from the CRT output driving stage and a switching signal, wherein the first transistor pair selectively delivers the cathode feedback current to the video processor;

a second transistor pair having alternately biased transistors and which is positioned between the collector of the second transistor and the a collector of the current sinking transistor and which receives the switching signal; and, a switching transistor which receives the switching signal and is adapted to selectively turn off the current sinking transistor.

* * * * *